(12) United States Patent
Fu et al.

(10) Patent No.: US 12,237,601 B2
(45) Date of Patent: Feb. 25, 2025

(54) ELECTRICAL CONNECTOR AND ELECTRICAL CONNECTOR ASSEMBLY

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Dai-Pei Fu, Kunshan (CN); Chun-Hsiung Hsu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 357 days.

(21) Appl. No.: 17/810,454

(22) Filed: Jul. 1, 2022

(65) Prior Publication Data

US 2023/0006380 A1     Jan. 5, 2023

(30) Foreign Application Priority Data

Jul. 2, 2021 (CN) .......................... 202121489042.8

(51) Int. Cl.
| | |
|---|---|
| *H01R 13/426* | (2006.01) |
| *H01R 12/71* | (2011.01) |
| *H01R 13/502* | (2006.01) |
| *H01R 13/652* | (2006.01) |

(52) U.S. Cl.
CPC ......... *H01R 12/716* (2013.01); *H01R 13/426* (2013.01); *H01R 13/502* (2013.01); *H01R 13/652* (2013.01)

(58) Field of Classification Search
None
See application file for complete search history.

(56) References Cited

U.S. PATENT DOCUMENTS

| | | |
|---|---|---|
| 7,914,303 B2 | 3/2011 | Amleshi et al. |
| 8,021,191 B2 | 9/2011 | Long |
| 8,465,320 B2 | 6/2013 | Long |
| 10,164,380 B2 * | 12/2018 | Regnier ............... H01R 13/514 |
| 10,446,960 B2 * | 10/2019 | Guy Ritter ......... H05K 7/20336 |
| 10,575,441 B2 | 2/2020 | Hsu |
| 10,804,627 B2 | 10/2020 | Kachlic |
| 2019/0036263 A1 * | 1/2019 | Avery .................. H01R 13/405 |
| 2019/0089106 A1 | 3/2019 | Regnier |
| 2019/0116692 A1 * | 4/2019 | Little ................... H01R 13/502 |

FOREIGN PATENT DOCUMENTS

| | | | |
|---|---|---|---|
| CN | 101669256 A * | 3/2010 | .......... H01R 13/658 |
| CN | 110197962 | 9/2019 | |
| CN | 110797689 A * | 2/2020 | |

* cited by examiner

*Primary Examiner* — Tho D Ta
(74) *Attorney, Agent, or Firm* — Ming Chieh Chang

(57) ABSTRACT

An electrical connector includes: an insulating housing having a front housing having a front top wall and a pair of front side walls and a rear housing cooperating with the front housing; and plural terminal modules accommodated in the insulating housing, each of the terminal modules including an insulating body and plural conductive terminals held in the insulating body, wherein the rear housing includes a rear top wall and a pair of rear side walls extending downward from the rear top wall, and the rear top wall and the pair of rear side walls surround the terminal module in three directions.

19 Claims, 18 Drawing Sheets

ELECTRICAL CONNECTOR AND ELECTRICAL CONNECTOR ASSEMBLY

BACKGROUND OF THE INVENTION

1. Field of the Invention

The present invention relates to an electrical connector and electrical connector assembly having a plurality of terminal modules.

2. Description of Related Arts

CN Patent No. 110197962 discloses an electrical connector assembly comprising an electrical connector having an insulating housing and a plurality of terminal modules arranged in a lateral direction and accommodated in the insulating housing. The insulating housing includes a front housing and a rear housing assembled with the front housing. The rear housing surrounds the terminal modules from the back and two sides such that the size of the insulating housing in a front-to-rear direction is large, thereby increasing the overall size of the electrical connector in the front-to-rear direction.

An improved electrical connector assembly is desired.

SUMMARY OF THE INVENTION

A main object of the present invention is to provide an electrical connector and electrical connector assembly with a smaller overall size and with an insulating shell that is easy to form.

To achieve the above-mentioned object, an electrical connector for mating with a plug module in a front-to-rear direction comprises: an insulating housing including: a front housing having a front top wall and a pair of front side walls connected to the front top wall, the front housing being provided with an upper mating slot and a lower mating slot spaced apart in a top-to-bottom direction perpendicular to the front-to-rear direction; and a rear housing cooperating with the front housing; and a plurality of terminal modules arranged in a transverse direction perpendicular to the front-to-rear direction and the top-to-bottom direction and accommodated in the insulating housing, each of the terminal modules including an insulating body and a plurality of conductive terminals held in the insulating body, the conductive terminals including contact portions disposed on opposite sides of the upper mating slot and the lower mating slot, wherein the rear housing includes a rear top wall and a pair of rear side walls extending downward from the rear top wall, and the rear top wall and the pair of rear side walls surround the terminal module in three directions.

To achieve the above-mentioned object, an electrical connector assembly comprises a cage and an electrical connector installed in the cage for mating with a plug module in a front-to-rear direction, the electrical connector comprising: an insulating housing including: a front housing having a front top wall and a pair of front side walls connected to the front top wall, the front housing being provided with an upper mating slot and a lower mating slot spaced apart in a top-to-bottom direction perpendicular to the front-to-rear direction; and a rear housing cooperating with the front housing; and a plurality of terminal modules arranged in a transverse direction perpendicular to the front-to-rear direction and the top-to-bottom direction and accommodated in the insulating housing, each of the terminal modules including an insulating body and a plurality of conductive terminals held in the insulating body, the conductive terminals including contact portions disposed on opposite sides of the upper mating slot and the lower mating slot, wherein the rear housing includes a rear top wall and a pair of rear side walls extending downward from the rear top wall, and the rear top wall and the pair of rear side walls surround the terminal module in three directions.

Compared to the prior art, in the electrical connector and electrical connector assembly of the present invention, the insulating shell is composed of two parts, the front housing and the rear housing, so it is easy to form, and the rear housing includes a rear top wall and a pair of rear side walls extending downward from the rear top wall, and the rear top wall and the pair of rear side walls surround the terminal mold in three directions reducing the size of the insulating housing in the front-to-rear direction, thereby reducing the overall size of the electrical connector in the front-to-rear direction.

DETAILED DESCRIPTION OF THE PREFERRED EMBODIMENT

Figure 1:
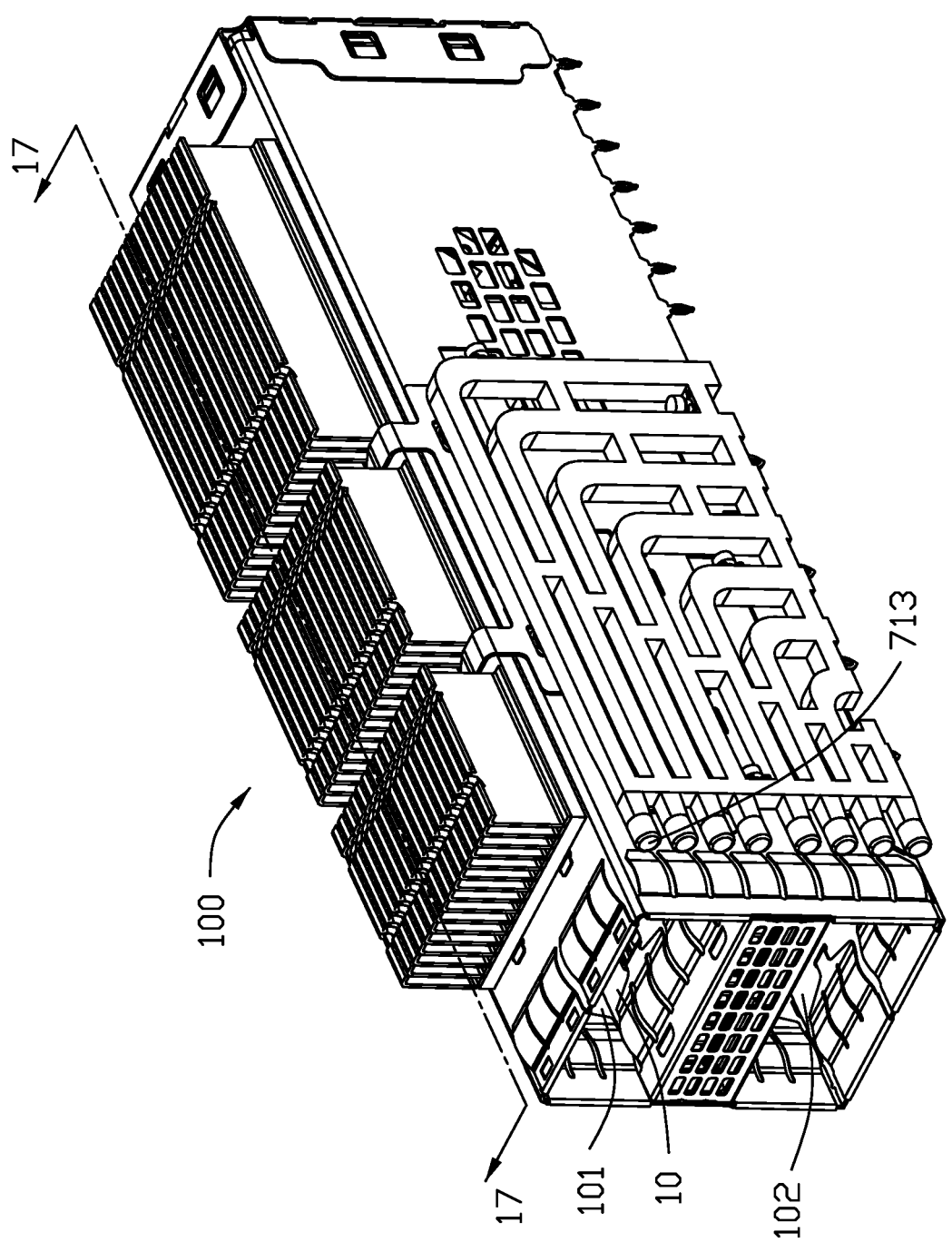
FIG. 1 is a perspective view of an electrical connector assembly in accordance with the present invention.

Referring to FIGS. 1-18, an electrical connector assembly 100 of the present invention is to be mounted on an external circuit board (not shown) and can be inserted by a mating plug module (not shown). The electrical connector assembly 100 includes a cage 1, a receptacle connector 3 received in the cage 1, a heat dissipation device 5 arranged on the outside of the cage 1 and a light guide assembly 7 installed on the outside of the cage 1.

Referring particularly to FIGS. 1-6, the cage 1 includes a top wall 11, a bottom wall 14 parallel to the top wall 11, a pair of side walls 12 extending downward from the top wall 11 and connecting to the bottom wall 14, a rear wall 13 at the rear of the side wall 12 and the top wall 11. The top wall 11 and the pair of side walls 12 enclose a receiving space 10 with a front end opening. The bottom wall 14 faces the external circuit board. The rear wall 13 is assembled and fixed to rear end of the side wall 12 and the rear end of the top wall 11. The rear wall 13 is a separate design structure from the side wall 12 and the top wall 11.

The receptacle connector 3 is accommodated in the receiving space 10. and located at the rear of the receiving space 10. The plug module can be inserted and accommodated into the receiving space 10 through the front opening and to be connected to the receptacle connector 3. The bottom wall 14 does not extend rearwardly to the rear wall 13 so that the receptacle connector 3 can be mounted downwardly on the external circuit board. The receptacle connector 3 includes an insulating housing 30 and a plurality of terminal modules 40 accommodated in the insulating housing 30. The size of the insulating housing 30 in the front-to-rear direction is larger than the size in the top-to-bottom direction and larger than the size in the left-right direction. The insulating housing 30 includes a front housing 301 and a rear housing 303 that cooperates with the front housing 301. The front housing 301 includes an upper mating slot 310 and a lower mating slot 320 protruding forward. The upper mating slot 310 and the lower mating slot 320 are arranged at intervals in the vertical direction. The upper mating slot 310 and the lower mating slot 320 can be inserted by mating tongue plate of different plug modules. The front housing 301 includes a front top wall 31 and a pair of front side walls 32 connected to the front top wall 31. Each of the front side walls 32 includes a front main side wall portion 321, a front upper side wall portion 322 extending rearward from the upper portion of the front main side wall portion 321, and a front lower side wall portion 323 extending backward from the lower portion of the front main side wall portion 321. A hollow portion 324 is formed between the front upper side wall portion 322 and the front lower side wall portion 323 to facilitate the installation or removal of the terminal module 40. The rear of the front top wall 31 is provided with guide grooves 315 for guiding the terminal module 40 to be installed in the insulating housing 30.

The rear housing 303 includes a rear top wall 33 and a pair of rear side walls 34 extending downward from the rear top wall 33. The rear side wall 34 includes a rear main side wall portion 341, a rear upper side wall portion 342 extending forward from the upper portion of the rear main side wall portion 341, and a rear lower side wall portion 343 extending forward from a lower portion of the rear main side wall portion 341. The rear housing 303 does not have a rear wall. The rear housing 303 surrounds the terminal module 40 in three directions. The rear end surfaces of the rear top wall 33 and the rear side wall 34 extend backward and do not exceed the rear end surface of the terminal module 40.

One of the front upper side wall portion 322 and the front lower side wall portion 323 is provided with a front guide groove 350, and the other is provided with a front guide rail 360. The rear upper side wall portion 342 and the rear lower side wall portion 343 are correspondingly provided with rear guide rail 351 and rear guide groove 361. Specifically, in this embodiment, the front guide groove 350 is provided on the front upper side wall portion 322, and the front guide rail 360 is provided on the front lower side wall portion 323. The front guide groove 350 is recessed inward from the surface of the front side wall 32. The rear guide groove 361 is recessed inward from the outer surface of the rear side wall 34. The front guide groove 350 is provided with a latching protrusion 355, and the rear guide rail 351 is provided with a concave portion 356 that is engaged with the latching protrusion 355.

The terminal modules 40 are sheet-like and stacked on each other in the lateral direction. The terminal module 40 comprises a plurality of signal terminal modules 41 and a plurality of ground terminal modules 42. The signal terminal module 41 and the ground terminal module 42 are arranged in the mode of ground, signal and signal. Each of the signal terminal modules 41 includes an insulating body 401 and a plurality of signal terminals 410 held in the insulating body 401. Each of the ground terminal modules 42 includes an insulating body 402 and a plurality of ground terminals 420 held in the insulating body 402. The ground terminals 420 and the signal terminals 410 are conductive. Each of the signal terminals 410 includes a holding portion 415 integrally formed with the insulating body 401, a contact portion 411 extends forward out of the insulating body 401 to match with the plug module, and a mounting portion 413 extending downward out of the insulating body 401 to mounted on the external circuit board. The signal terminal 410 includes a first upper signal terminal 431, a second upper signal terminal 432, a third upper signal terminal 433 and a fourth upper signal terminal 434. The contact portion s 411 of the first upper signal terminal 431 and the second upper signal terminal 432 are disposed on the upper side of the upper mating slot 310. The third upper signal terminal 433 and the fourth upper signal terminal 434 are disposed on the lower side of the upper mating slot 310. The first upper signal terminal 431 and the fourth upper signal terminal 434 form an upper front mating port 405, the second upper signal terminal 432 and the third upper signal terminal 433 form an upper rear mating port 406. The upper front mating port 405 and the upper rear mating port 406 are arranged in the front-to-rear directions for cooperating with the same mating tongue plate. The signal terminals 410 in the adjacent signal terminal modules 41 can form a pair of differential signal terminals for transmitting a pair of differential signals. The two contact portions 411 of the pair of differential signal terminals are side-to-side coupling. The holding portions 415 of the pair of differential signal terminals are wide-to-wide coupling, and the mounting portions 413 of the pair of differential signal terminals are wide-to-wide coupling. The signal terminal 410 further comprises a first lower signal terminal 435, a second lower signal terminal 436, a third lower signal terminal 437 and a fourth lower signal terminal 438. The contact portions 411 of the first lower signal terminal 435 and the second lower signal terminal 436 are disposed on the upper side of the lower mating slot 320. The contact portions 411 of the third lower signal terminal 437 and the fourth lower signal terminal 438 are disposed on the lower side of the lower mating slot 320. The first lower signal terminal 435 and the fourth lower signal terminal 438 form a lower front mating port 407. The second lower signal terminal 436 and the third lower signal terminal 437 form a lower rear mating port 408. The lower front mating port 407 and the lower rear mating port 408 are arranged in the front-to-rear direction for matching with the same mating tongue plate. Each of the ground terminals 420 includes a ground contact portion 421 that is matched with the mating tongue plate, a ground mounting portion 423 that can be mounted on an external circuit board, and a ground intermediate portion 425 between the ground contact portion 421 and the ground mounting portion 423. The ground terminal 420 includes a first upper ground terminal 441, a second upper ground terminal 442, a third upper ground terminal 443 and a fourth upper ground terminal 444 that shields the corresponding signal terminal 410 in the lateral direction. The ground contact portions 421 of the first upper ground terminal 441 and the second upper ground terminal 442 are disposed on the upper side of the upper mating slot 310. The ground contact portions 421 of the third upper ground terminal 443 and the fourth upper ground terminal 444 are disposed on the lower side of the upper mating slot 310. The ground terminals further include a first lower ground terminal 445, a second lower ground terminal 446, a third lower ground terminal 447 and a fourth lower ground terminal 448. The contact portion 411 of each of the signal terminals 410 is aligned with the corresponding ground contact portion 421 of the ground terminal 420 in the lateral direction. The ground terminal 420 in one of the ground terminal modules 42 is stamped from the same metal plate, and is a one-piece structure. The ground intermediate portions 425 of different ground terminals 420 in one of the ground terminal modules 42 are connected together. Specifically, in this embodiment, the grounding intermediate portion 425 of the first upper ground terminal 441 and the second upper ground terminal 442 is an integral structure, the grounding intermediate portion 425 of the fourth upper grounding terminal 444 and the third upper grounding terminal 443 is an integrated structure. The contact portion 411 of each of the signal terminals 410 and the ground contact portion 421 of the ground terminal 420 are correspondingly disposed on opposite sides of the upper mating slot 310 and the lower mating slot 320.

The top of each of the terminal modules 40 is provided with a guide protrusion 45 which is matched with the guide groove 315. The insulating body 401 of each terminal module 40 is provided with an air opening 412 for exposing the corresponding signal terminal 410 and the ground terminal 420 to the air. At least one signal terminal is exposed to air for at least half of its entire terminal length. In this embodiment, At least 70% of the length of the second upper signal terminal 432 is exposed to the air, so as to effectively solve the problem of impedance matching during signal transmission. At least one air opening 412 exposes the first upper signal terminal 431, the second upper signal terminal 432, the third upper signal terminal 433 and the fourth upper signal terminal 434 to the air. The width dimension of the holding portion 415 of the signal terminal 410 covered in the insulating body 401 is smaller than the width dimension exposed to the air. The air opening 412 can adjust the impedance matching during signal transmission. The shape of the air openings 412 of two signal terminal module 41 is same. The size of the air opening 412 of the ground terminal module 42 is smaller than the size of the air opening 412 of the signal terminal module 41 to ensure impedance matching and facilitate the manufacture of the ground terminal module 42. The ground terminal 420 in the ground terminal module 42 includes at least one joint portion 426 extending out of the insulating body 401. The receptacle connector 3 further includes a conductive adhesive tape 47. The conductive adhesive tape 47 is pasted on the adjacent joints 426 of the ground terminal modules 42 to electrically connect the ground terminals 420 of different ground terminal modules 42.

Figure 2:
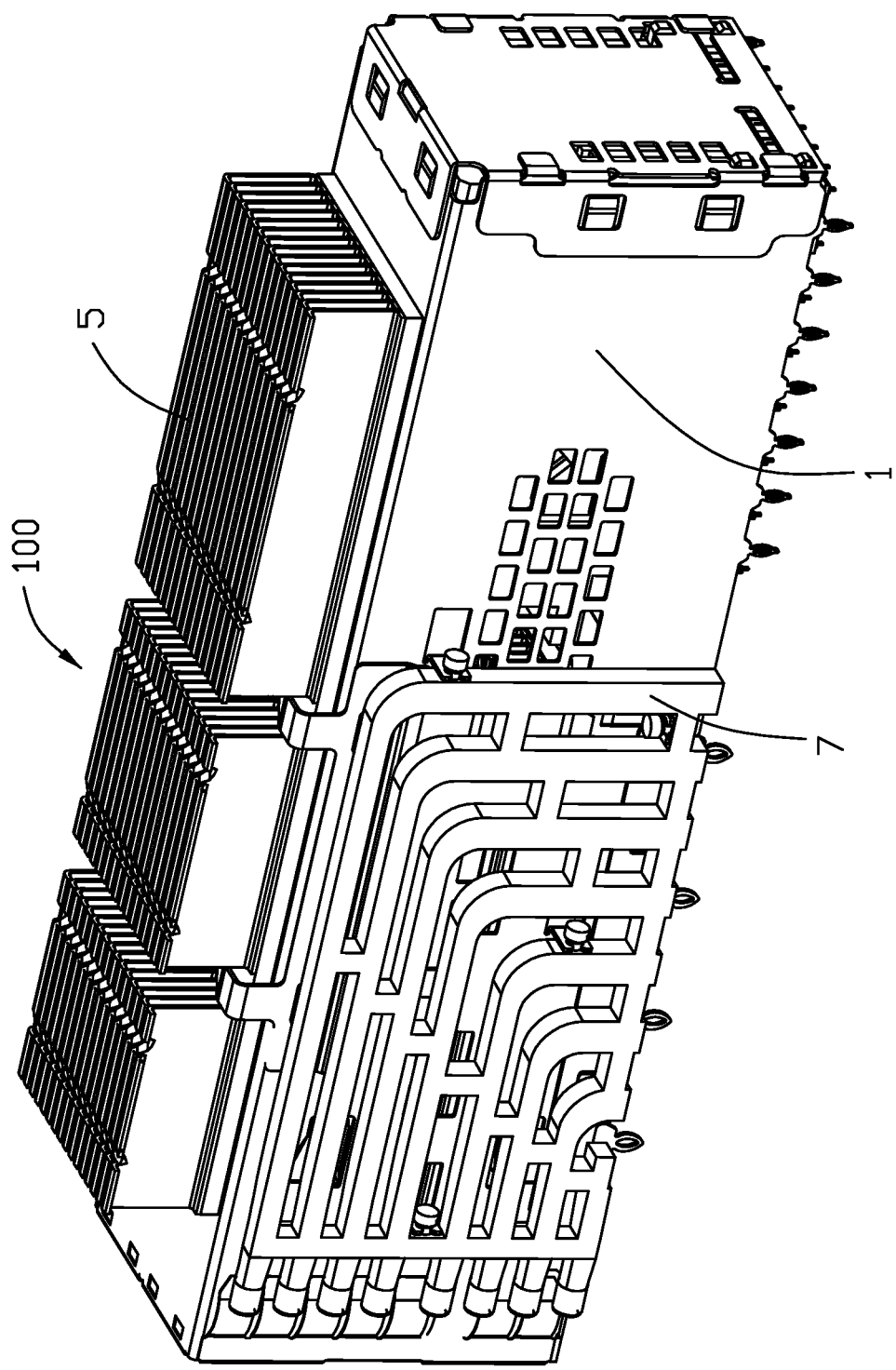
FIG. 2 is another perspective view of the electrical connector assembly in FIG. 1.
Figure 3:
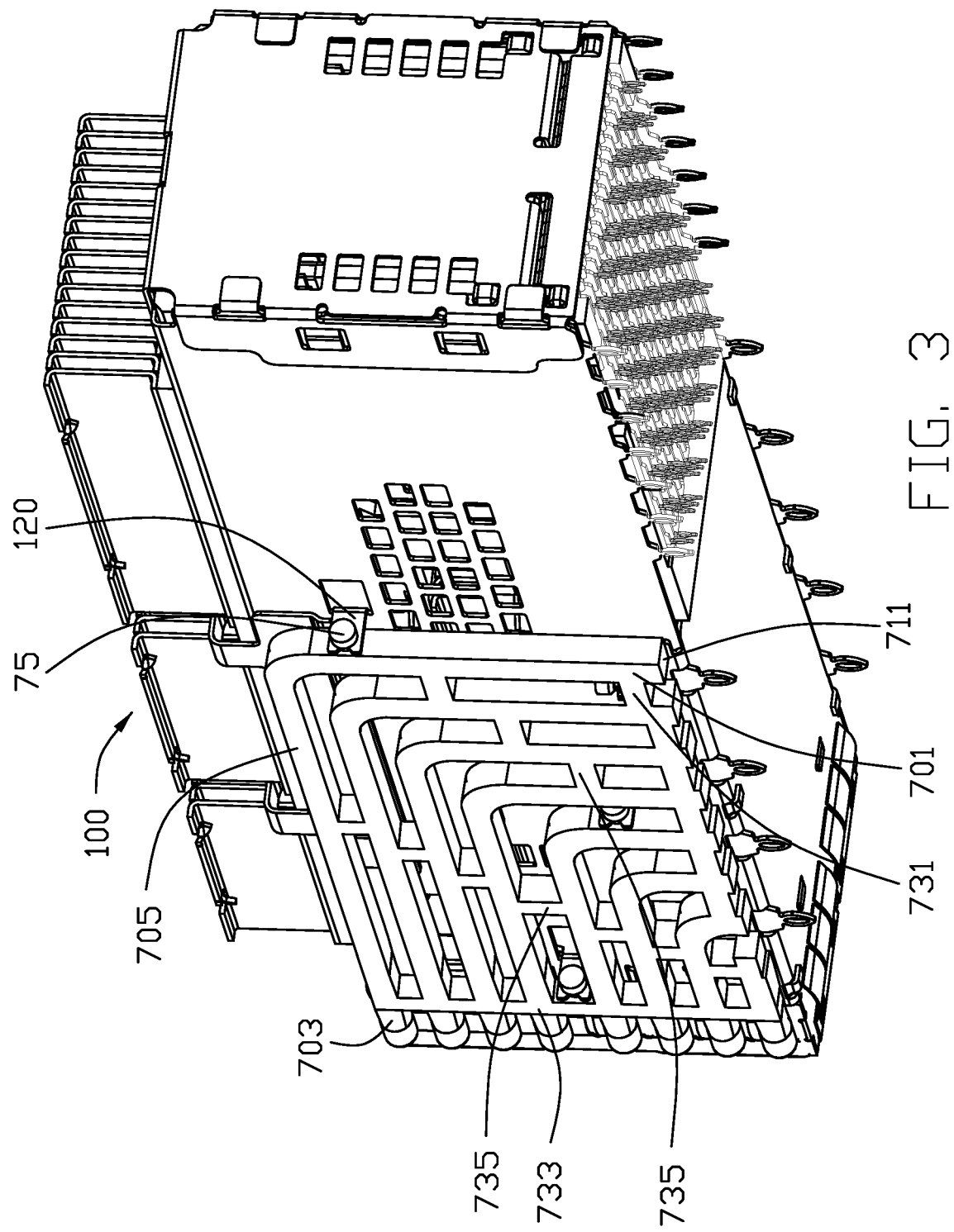
FIG. 3 is another perspective view of the electrical connector assembly in FIG. 1.
Figure 4:
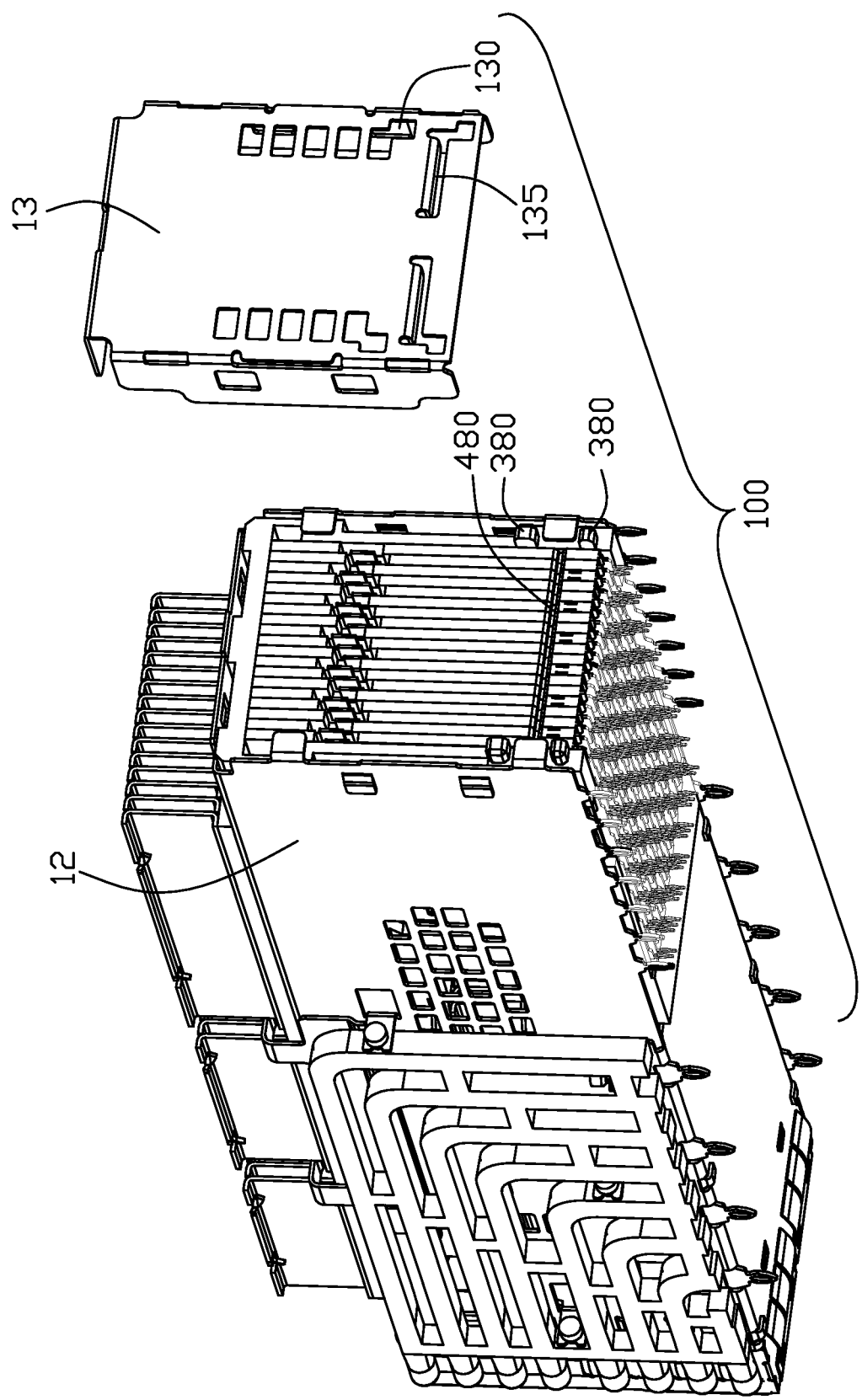
FIG. 4 is a perspective view of the electrical connector assembly in FIG. 3 with the rear wall of the cage separated.
Figure 5:
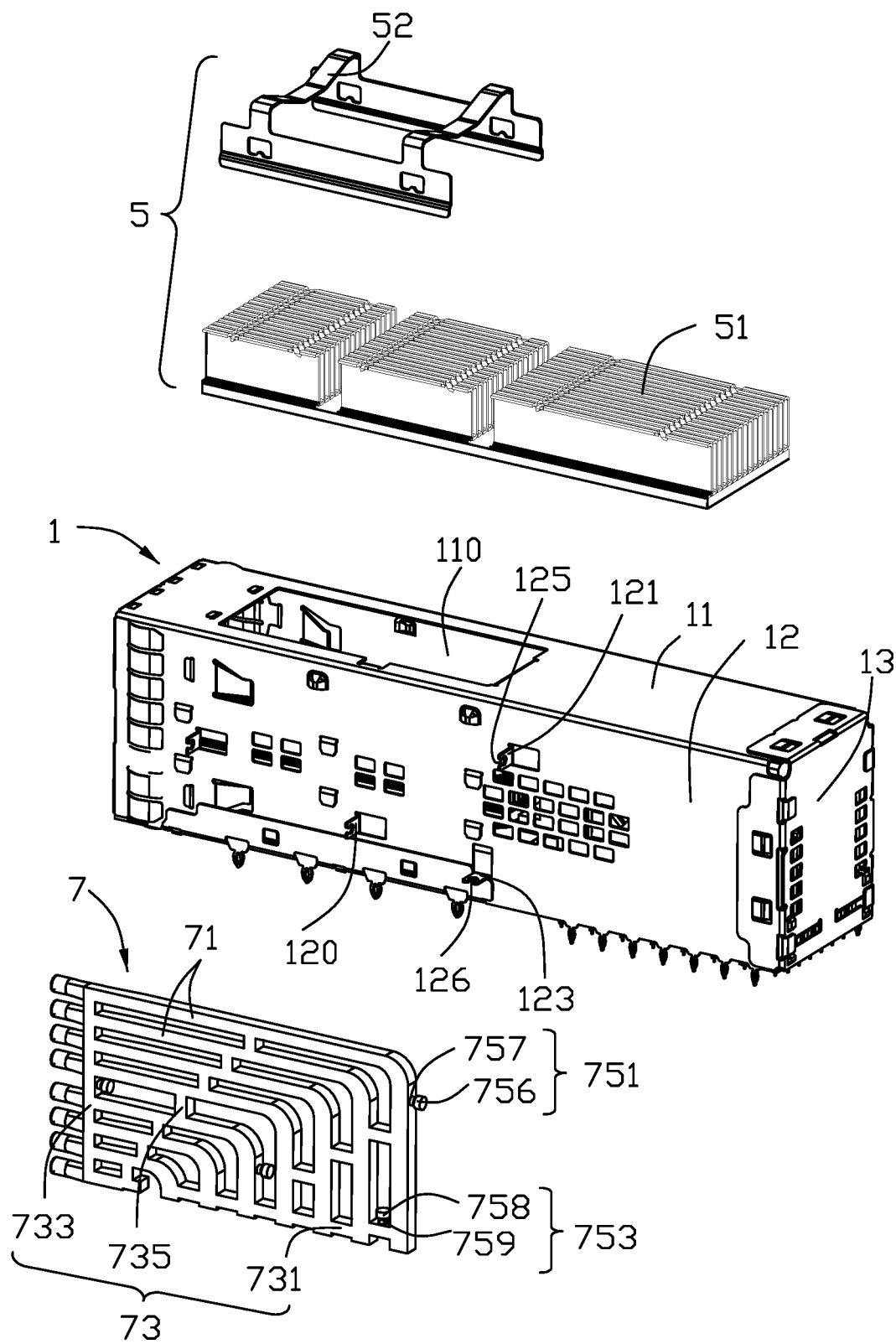
FIG. 5 is an exploded view of the electrical connector assembly in FIG. 4.
Figure 6:
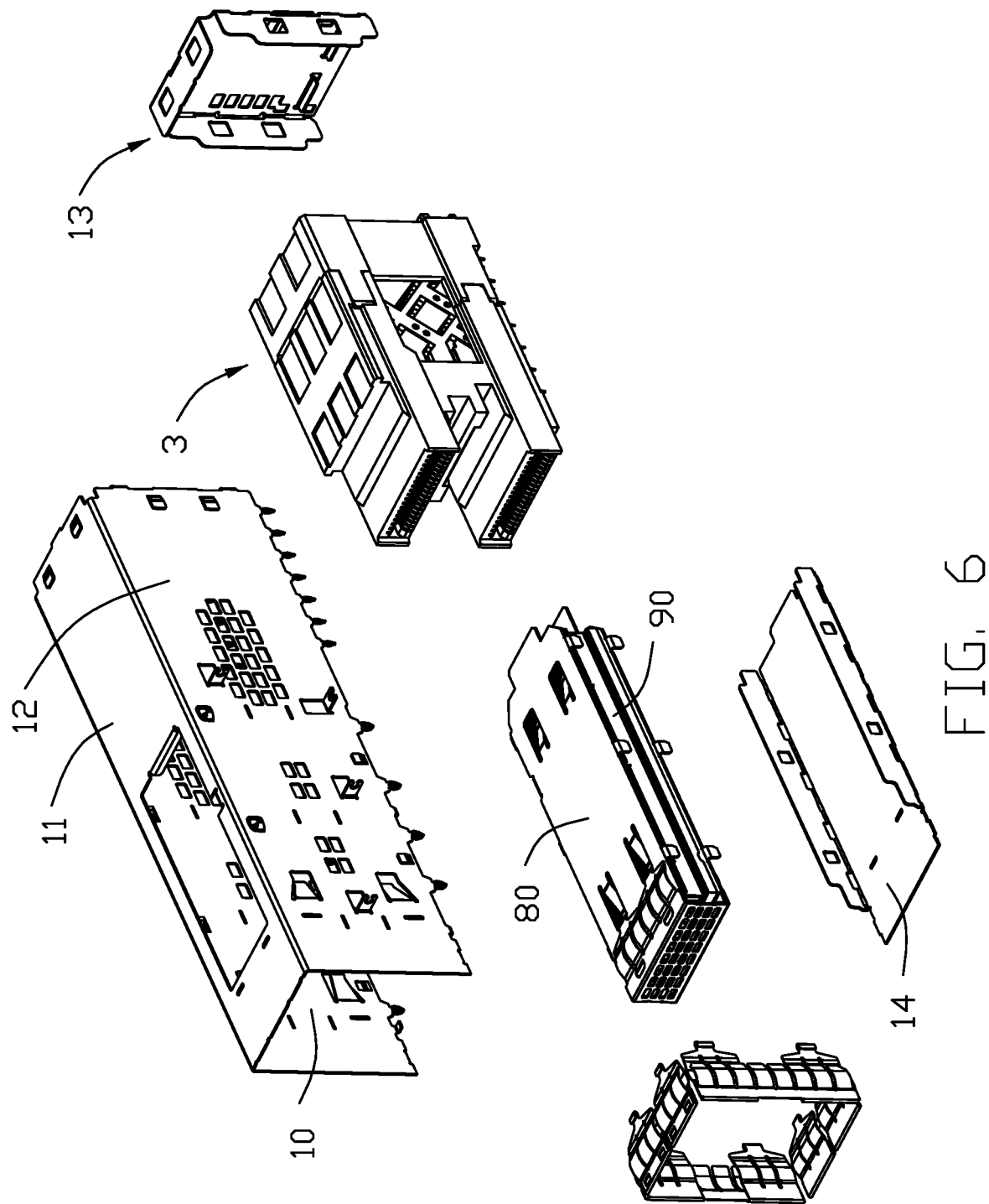
FIG. 6 is a further exploded view of the electrical connector assembly in FIG. 4 removing the heat dissipation device and light guide assembly.
Figure 7:
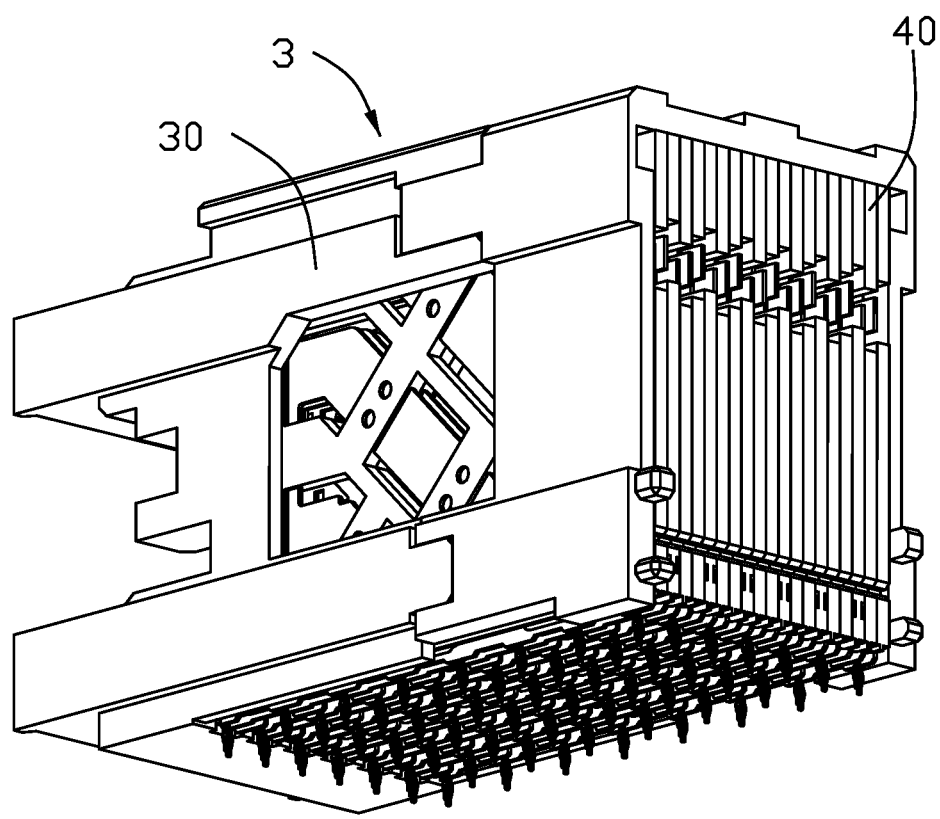
FIG. 7 is a perspective view of the electrical connector in FIG. 6.
Figure 8:
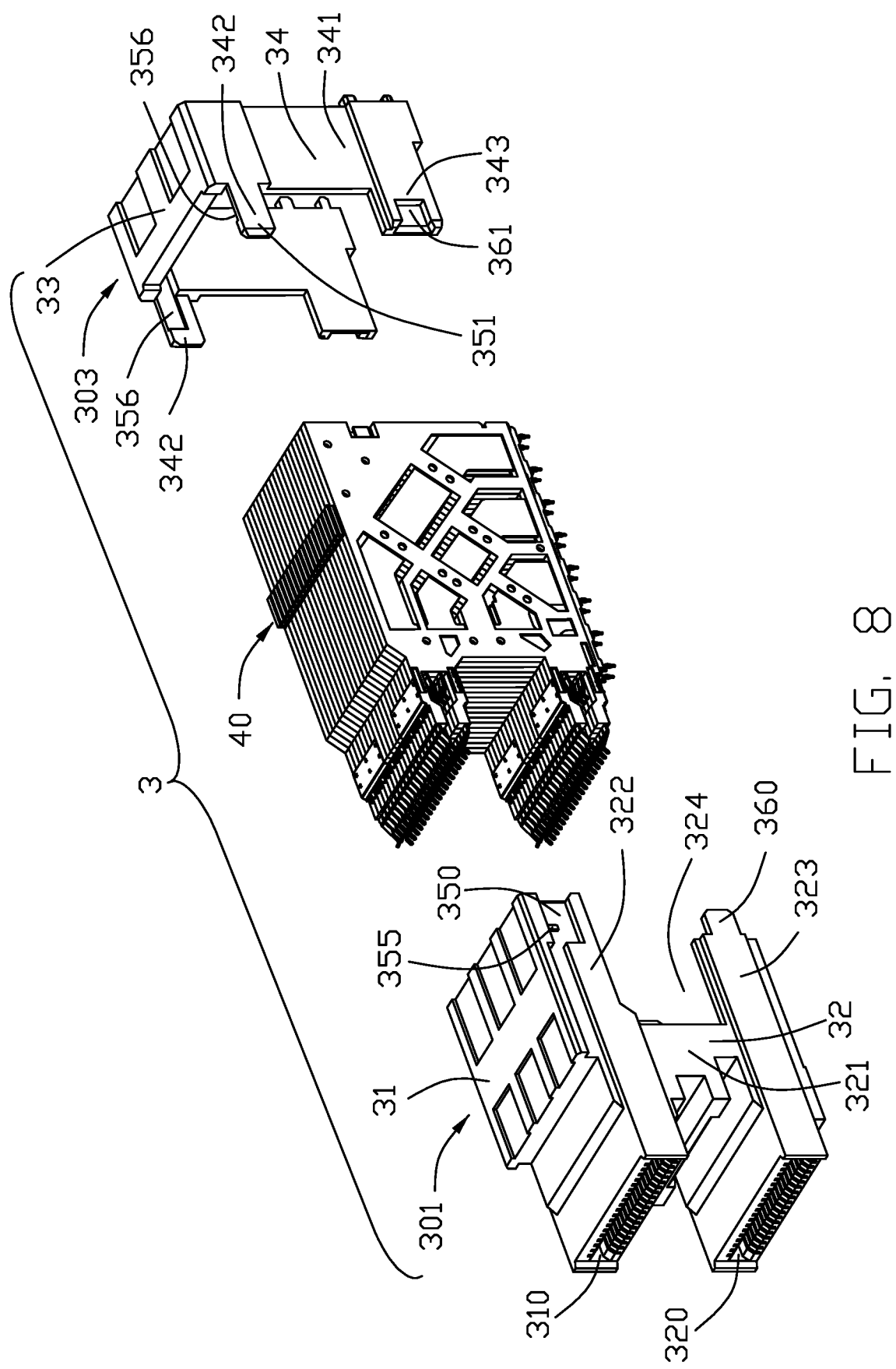
FIG. 8 is an exploded view of the electrical connector of the electrical connector in FIG. 7.
Figure 9:
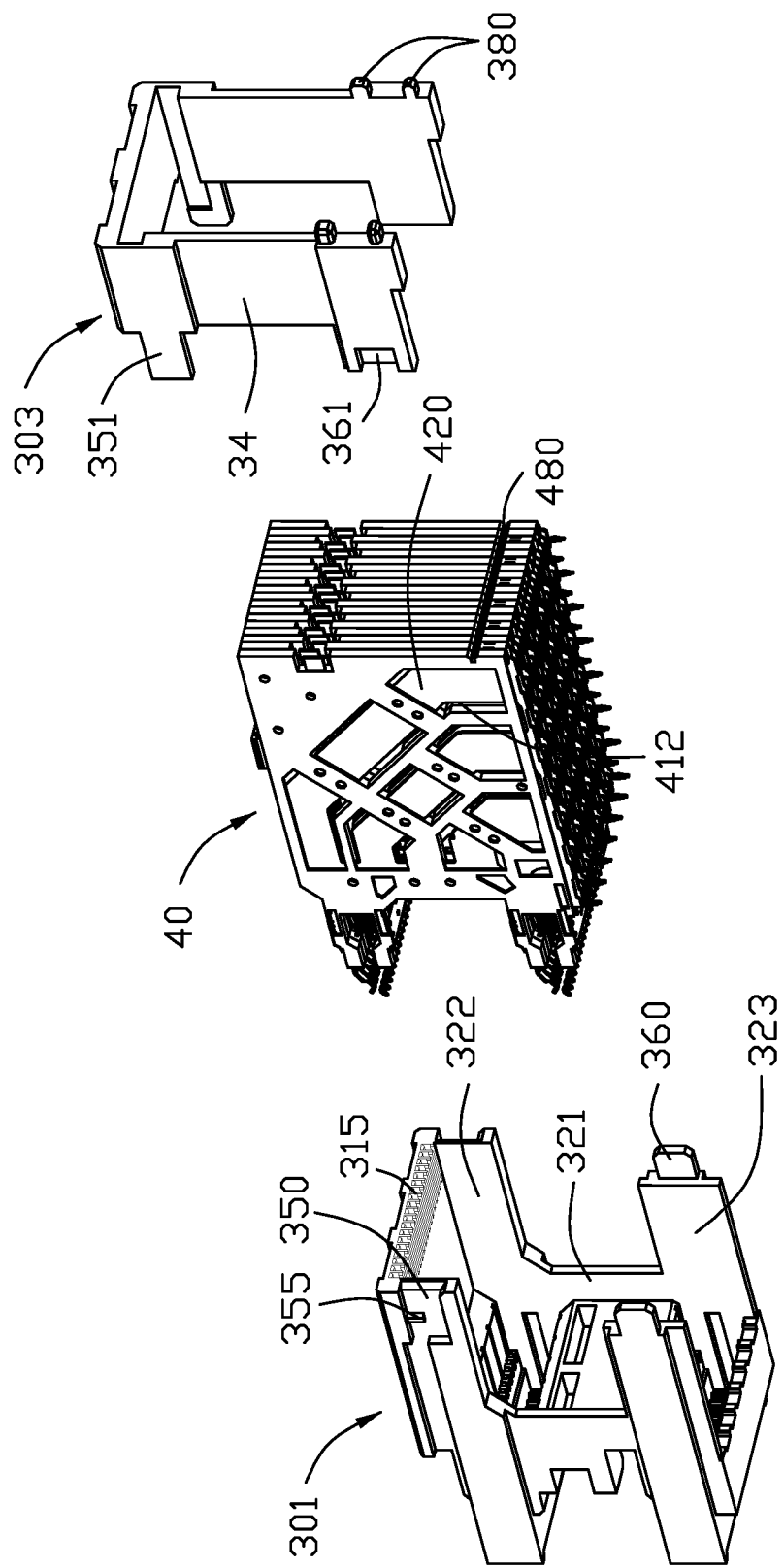
FIG. 9 is another perspective view of the electrical connector in FIG. 8.
Figure 10:
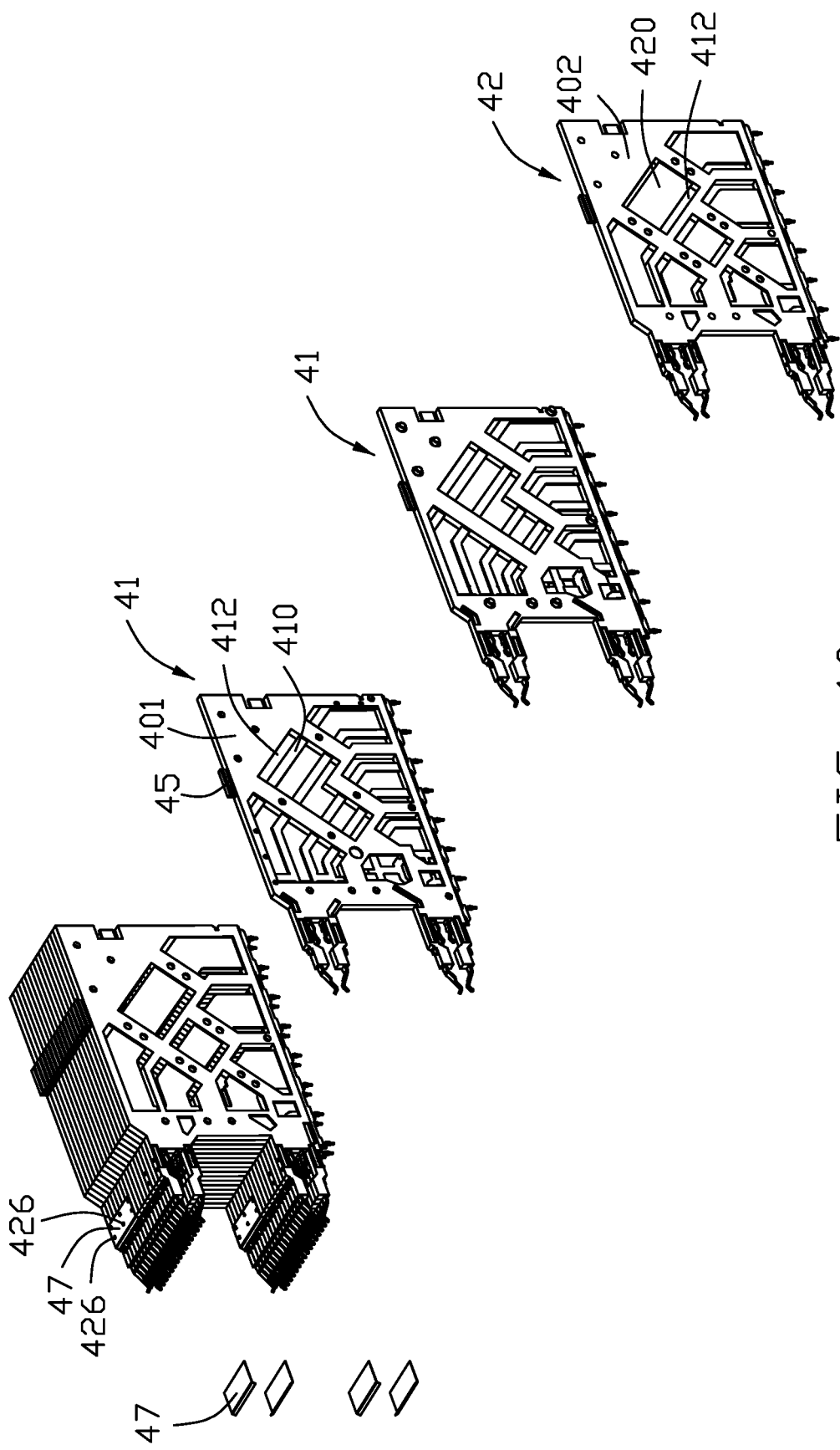
FIG. 10 is a perspective view the of the terminal module of the electrical connector in FIG. 9.
Figure 11:
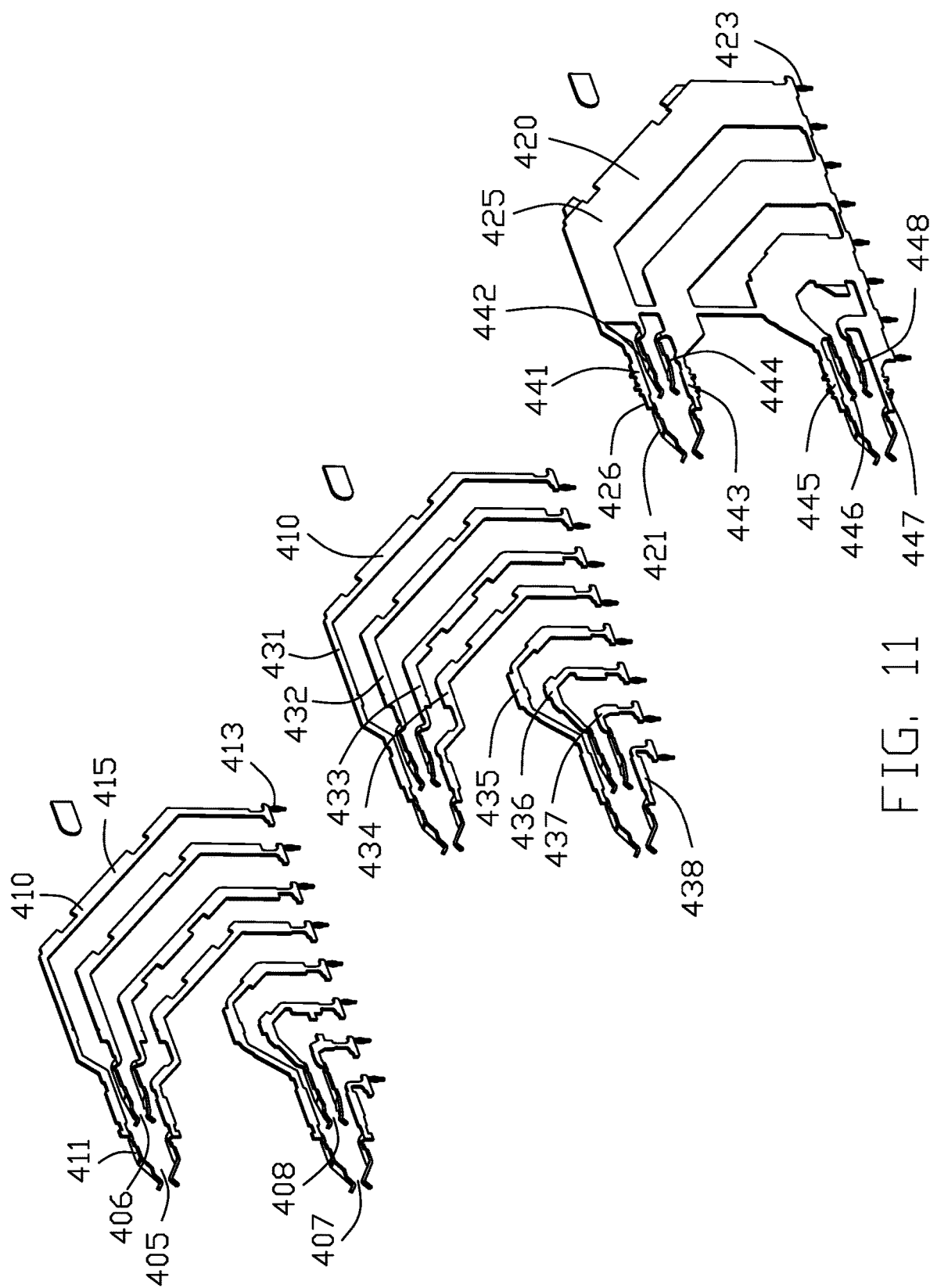
FIG. 11 is a perspective view of the conductive terminal of terminal module in FIG. 10.
Figure 12:
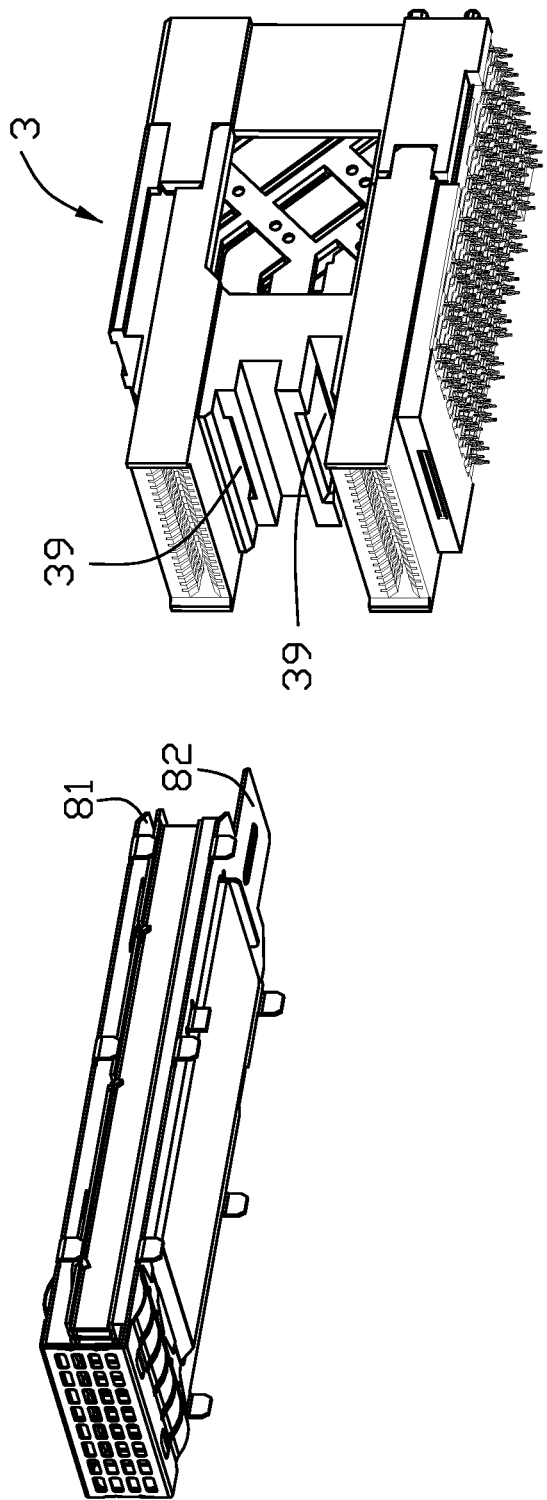
FIG. 12 is a perspective view of the electrical connector, the intermediate cage and the intermediate heat sink in FIG. 6.
Figure 13:
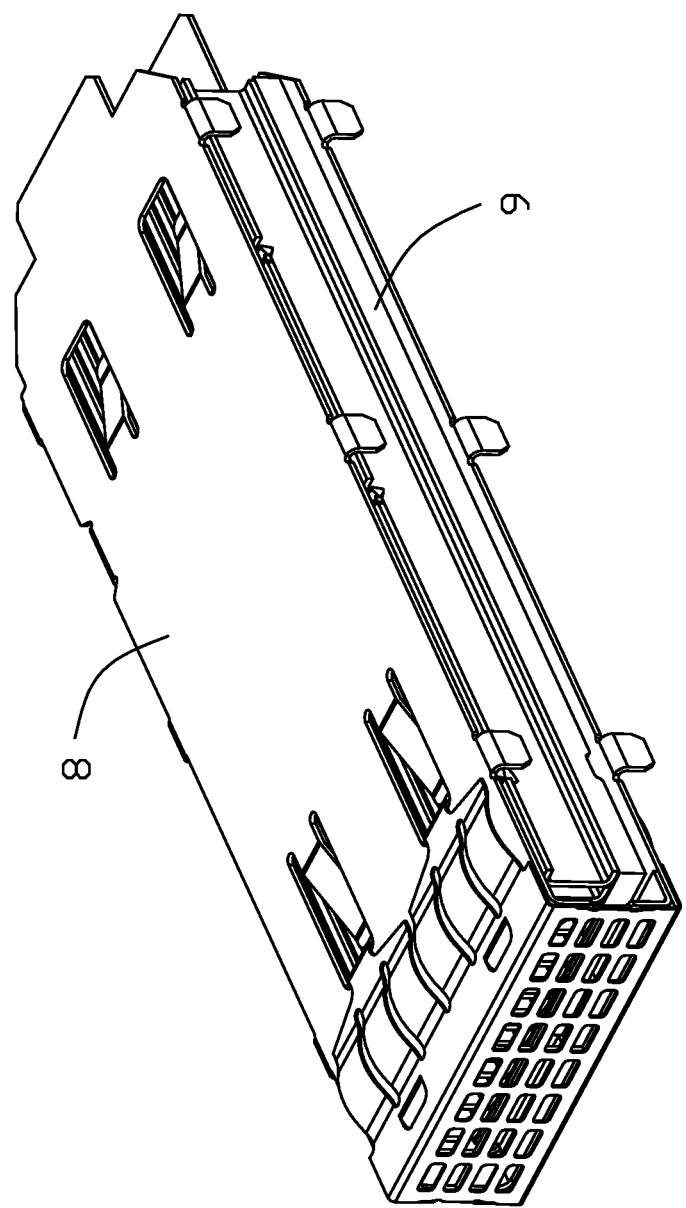
FIG. 13 is a perspective view of the intermediate cage and the intermediate heat sink in FIG. 12.
Figure 14:
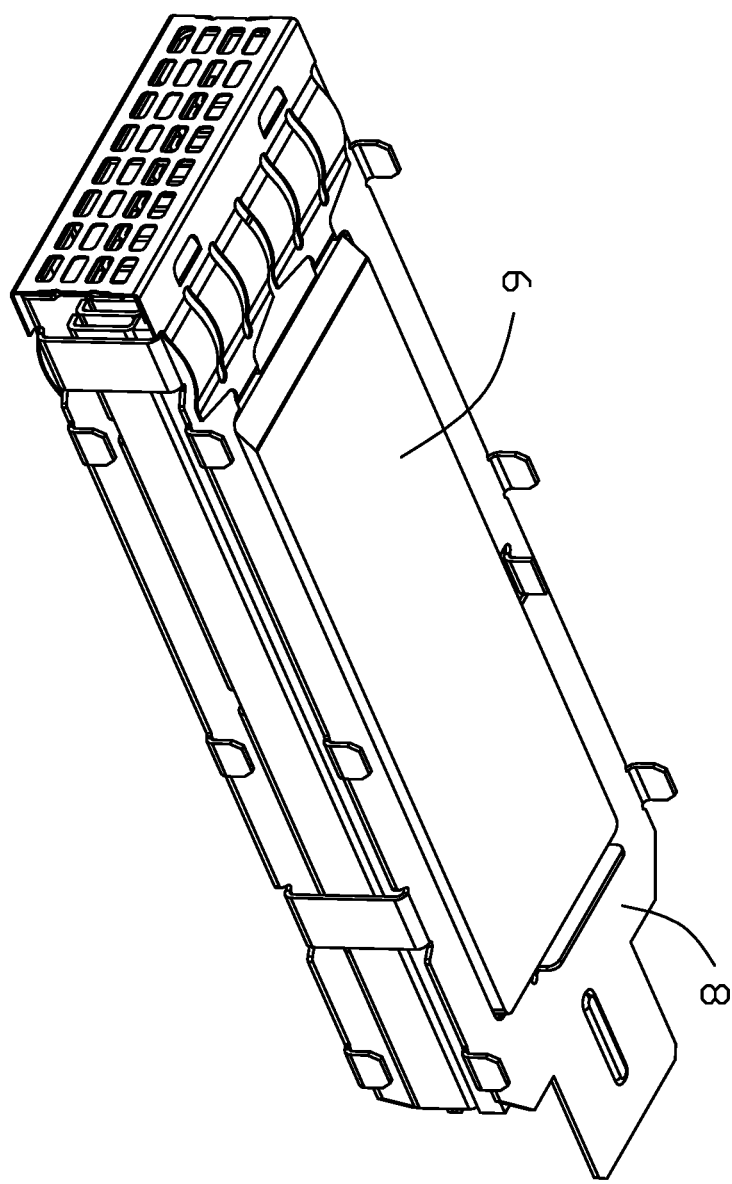
FIG. 14 is another perspective view of the intermediate cage and the intermediate heat sink in FIG. 13.
Figure 15:
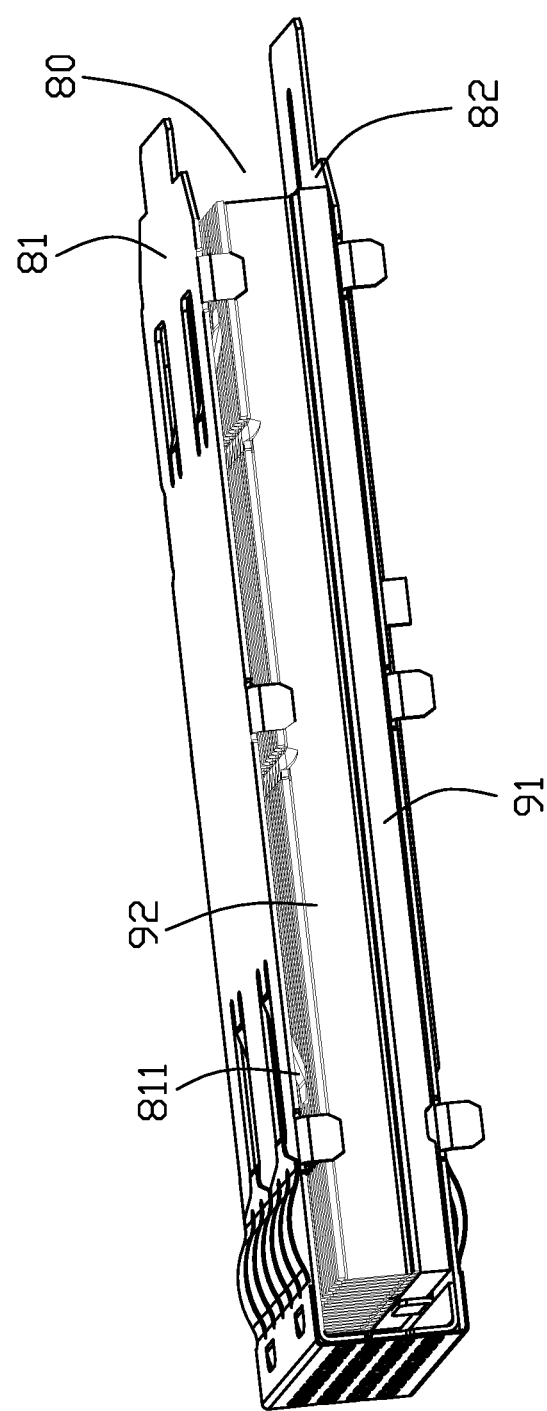
FIG. 15 is another perspective view of the intermediate cage and the intermediate heat sink in FIG. 13.
Figure 16:
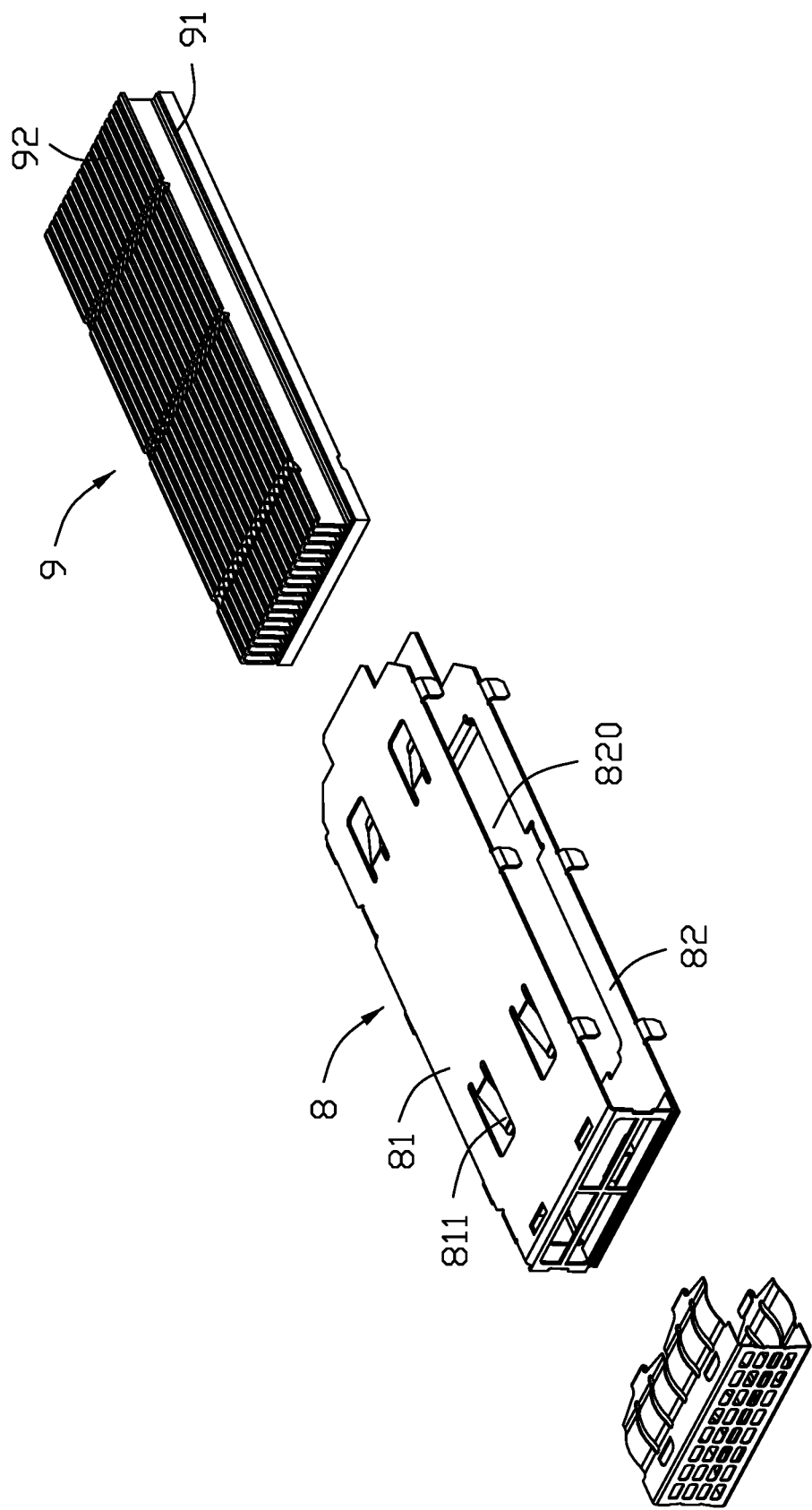
FIG. 16 is an exploded view of the intermediate cage and the intermediate heat sink in FIG. 12.
Figure 17:
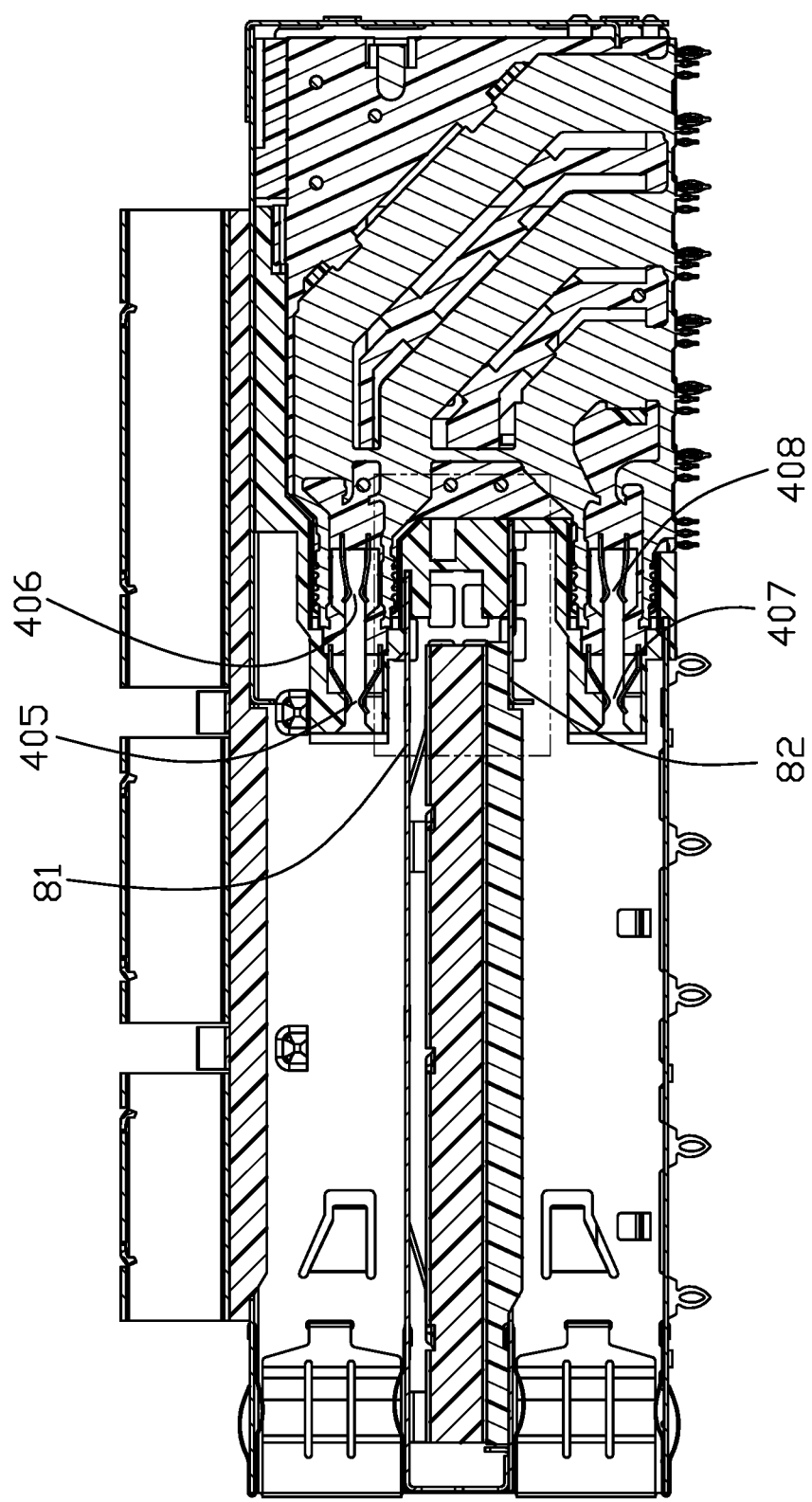
FIG. 17 is a cross-sectional view along line 17-17 of the electrical connector assembly in FIG. 1.
Figure 18:
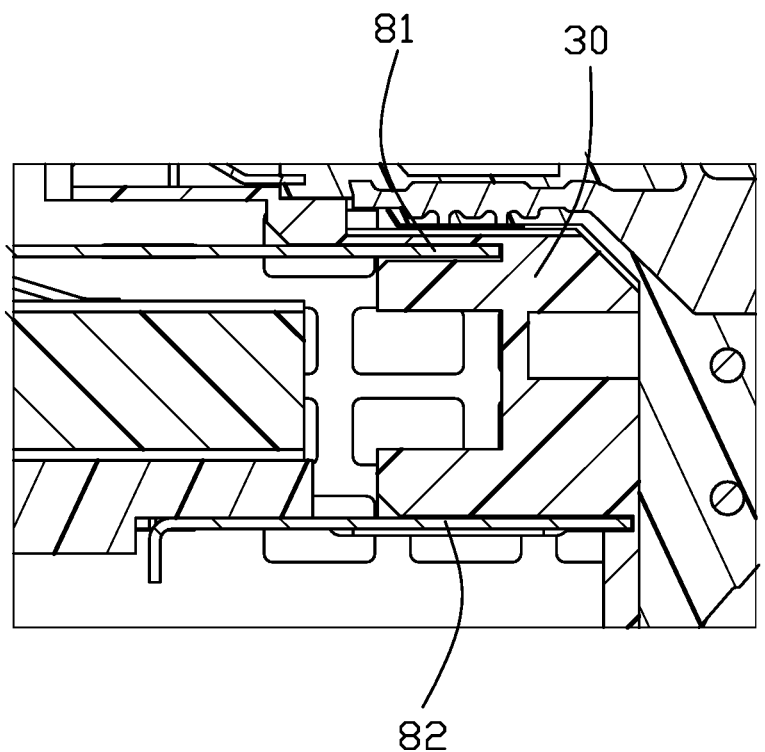
FIG. 18 is an enlarged view of the electrical connector assembly in FIG. 17.

Referring to FIGS. 2-3 and 10, the electrical connector assembly 100 further includes a fixing mechanism for fixedly the receptacle connector 3 to the rear wall 13. The fixing mechanism includes a first fixing mechanism for fixing the insulating housing 30 to the rear wall 13 and a second fixing mechanism for fixing the terminal module 40 to the rear wall 13. The first fixing mechanism includes a plurality of protruding portions 380 protruding rearward from the rear housing 303, and openings 130 formed on the rear wall 13 that match the corresponding protruding portions 380. The protruding portion 380 protrudes rearward from the rear end of the rear side wall 34. The protruding portion 380 is integrally molded with the rear side wall. The front surface of the rear wall 13 and the rear end surface of the rear side wall 34 are positioned relative to each other. The second fixing mechanism includes an inwardly recessed slot 480 formed on the rear side of the insulating body 401 of the terminal modules 40, and a metal tab 135 projecting forward from the rear wall 13 and receivable in the slot 480. The rear wall 13 and the metal sheet 135 are integrally formed by stamping. The receptacle connector 3 and the rear wall 13 are fixed together through the first fixing mechanism and the second fixing mechanism.

The heat dissipation device 5 is mounted on the outer side of the top wall 11. The heat dissipation device 5 includes a heat sink 51 and a clip 52 that spans the heat sink 51 and is snap-fitted with the side wall 12. The clip 52 is snap-fitted with the side wall 12 to fix the heat sink 51 on the cage 1.

The light guide assembly 7 is mounted on the outer side of one of the side walls 12. The light guide assembly 7 includes a plurality of light guide pipes 71, a connecting member 73 for connecting the different light guides together, and a first fixing member 75 different from the connecting member 73 for fixing the light guide assembly 7 on the side wall 12. The side wall 12 includes a second fixing member 120 matched with the first fixing member 75. The plurality of light guide pipes 71 are arranged in sequence in a vertical plane parallel to the side wall 12. The connecting member 73 connects the plurality of light guide pipes 71 into a whole. Each of the light guide pipe 71 includes a light input surface 711 facing the external circuit board and a light output surface 713 at the front. Each of the light guide pipe 71 includes a bottom portion 701 near the light input surface 711, a front portion 703 near the light output surface 713, and a connecting portion 705 therebetween. The plurality of light guide pipes 71, the first fixing member 75 and the connecting member 73 are integrally formed one-piece structures. The connecting member 73 includes a front-to-rear connecting member 731 for fixing the plurality of the light guide pipes 71 in the front-to-rear direction, a vertical connecting member 733 for fixing the plurality of the light guide pipes 71 in the vertical direction, and the intermediate member 735 connecting the connecting portions 705 together. The first fixing member 75 includes a plurality of upper-lower fixing members 751 for fixing the light guide assembly 7 on the side wall 12 in the vertical direction, and a plurality of front-to-rear fixing members 753 for fixing the light guide assembly 7 on the side wall 12 in the front-to-rear directions. The second fixing member 120 includes vertical metal sheets 121 that protrude outward from the side wall 12 to match with the upper-lower fixing members 751, and horizontal metal sheets 123 that cooperate with the front-to-rear fixing members 753. Each of the horizontal metal sheet 123 and the vertical metal sheet 121 are perpendicular to the side wall 12 and are integrally punched and bent from the side wall 12. Each of the upper-lower fixing members 751 include a front-to-rear mounting post 756 extending in the front-to-rear direction, and a radially recessed groove 757 on the periphery of the front-to-rear mounting post 756. Each of the front-to-rear fixing members 753 include a upper-lower mounting post 758 extending in the top-to-bottom direction, and a radially recessed grooves 759 on the periphery of the upper-lower mounting post 758. The end of each the vertical metal sheet 121 is provided with a receiving notch 125 for receiving the groove 757. The end each of the horizontal metal sheet 123 is provided with a receiving notch 126 for receiving the groove 759. The receiving notches 125, 126 and the corresponding grooves 757, 759 are snapped together to fix the light guide assembly 7 on the side wall 12.

The electrical connector assembly 100 further includes an intermediate cage 8 and an intermediate heat sink 9. The intermediate cage includes an upper wall 81, a lower wall 82 and an intermediate channel 80 formed between the upper wall 81 and the lower wall 82. The intermediate heat sink 9 is installed in the intermediate channel 80. The intermediate cage 8 divides the receiving space 10 into an upper receiving space 101 and a lower receiving space 102. The upper receiving space 101 and the lower receiving space 102 can respectively receive different plug modules. The top wall 11 includes an upper hole 110 communicating with the upper receiving space 101. The bottom of the heat sink 51 protrudes into the upper receiving space 101 through the upper hole 110, and conducts heat conduction with the plug module received in the upper receiving space 101. The lower wall 82 of the intermediate cage 8 includes a lower hole 820 communicating with the lower receiving space 102. The bottom of the middle heat sink 9 protrudes downward and extends into the lower receiving space 102 through the lower hole 820 to conduct heat conduction with the plug modules housed in the lower receiving space 102. The upper wall 81 of the intermediate cage 8 is provided with a plurality of downwardly protruding metal elastic pieces 811. The intermediate heat sink 9 includes a flat base body 91 and a plurality of fins 92 extending upward from the base body 91. The metal elastic pieces 811 presses downward against the heat fins 92 to fix the intermediate heat sink 9 in the intermediate cage 8, so there is no need to add additional fixing parts, which saves the cost and installation space. The insulating housing 30 of the receptacle connector 3 is provided with two forwardly opening slots 39. The slot 39 is used for receiving and fixing the rear parts of the upper wall 81 and the lower wall 82 of the intermediate cage 8 to relatively fix the intermediate cage 8 and the receptacle connector 3.

In the electrical connector assembly 100 of the present invention, the heat dissipation device 5 is disposed on the top wall of the cage, and the light guide assembly 7 is disposed on the side wall 12, so that the light guide assembly 7 does not block the heat dissipation of the heat dissipation assembly, and the plurality of light guide pipes 71 are connected into a whole through the connecting piece 73, and the light guide pipe assembly 7 is fixed on the side wall 12 of the cage 1 through the first fixing members 75 different from the connecting members 73. The light guide pipes 71 can be firmly and reliably connected as a whole, and can be effectively fixed on the side wall 12. The insulating hosing 30 the receptacle connector 3 is composed of two parts, the front housing 301 and the rear housing 303, which is convenient for molding, and the rear housing 303 includes a rear top wall 33 and a pair of rear side walls 34 extending downward from the rear top wall 33. The rear top wall 33 and the pair of rear side walls 34 surrounds the terminal module 40 in three directions, reducing the size of the insulating housing 30 in the front and rear directions, thereby reducing the overall size of the electrical connector assembly 100. The fixing mechanism fixes the receptacle connector 3 and the rear wall 13 of the cage 1 together, so that the positions of the receptacle connector 3 and the cage 1 are relatively fixed.

What is claimed is:

1. An electrical connector for mating with a plug module in a front-to-rear direction, comprising:
    an insulating housing including:
        a front housing having a front top wall and a pair of front side walls connected to the front top wall, the front housing being provided with an upper mating slot and a lower mating slot spaced apart in a top-to-bottom direction perpendicular to the front-to-rear direction; and
        a rear housing cooperating with the front housing; and
    a plurality of terminal modules arranged in a transverse direction perpendicular to the front-to-rear direction and the top-to-bottom direction and accommodated in the insulating housing, each of the terminal modules including an insulating body and a plurality of conductive terminals held in the insulating body, the conductive terminals including contact portions disposed on opposite sides of the upper mating slot and the lower mating slot, wherein
    the rear housing includes a rear top wall and a pair of rear side walls extending downward from the rear top wall, and the rear top wall and the pair of rear side walls surround the plurality of terminal modules in three directions; and
    the front side wall includes a front main side wall portion, a front upper side wall portion extending rearward from an upper part of the front main side wall portion, a front lower side wall portion extending rearward from a lower part of the front main side wall portion, and a hollow portion formed therebetween to facilitate access of the terminal module.

2. The electrical connector as claimed in claim 1, wherein a size of the insulating housing in the front-to-rear direction is larger than that in the top-to-bottom direction and larger than that in the transverse direction.

3. The electrical connector as claimed in claim 1, wherein a top of the terminal module is provided with a guide protrusion, and a rear area of the front top wall is provided with a guide groove matching the guide protrusion.

4. The electrical connector as claimed in claim 1, wherein a rear end face of the rear upper wall and a rear end face of the rear side wall extend backwards to not beyond a rear end face of the terminal module.

5. The electrical connector as claimed in claim 1, wherein the rear side wall includes a rear main side wall portion, a rear upper side wall portion extending forward from an upper part of the rear main side wall portion, and a rear lower side wall portion extending forward from a lower part of the rear main side wall portion, one of the front upper side wall portion and the front lower side wall portion is provided with a front guide groove and the other is provided with a front guide rail, and the rear upper side wall portion and the rear lower side wall portion are correspondingly provided with rear guide rails and rear guide grooves that match the front guide groove and the front guide rail.

6. The electrical connector as claimed in claim 5, wherein the front guide groove is provided with a latching protrusion, and the rear guide rail is provided with a concave portion for engaging the latching protrusion.

7. The electrical connector as claimed in claim 1, wherein the terminal module includes a plurality of signal terminal modules and a plurality of ground terminal modules arranged so that the conductive terminals in adjacent signal modules form a pair of differential signal terminals and the conductive terminals in one ground terminal module is a one-piece structure.

8. The electrical connector as claimed in claim 7, further comprising a conductive adhesive tape, and wherein each of the conductive terminals in the ground terminal module includes at least one joint portion extending out of the insulating body, and the joint portions of adjacent ground terminal modules are electrically connected through the conductive adhesive tape.

9. The electrical connector as claimed in claim 7, wherein the insulating body of each terminal module is provided with an opening for exposing the conductive terminal to air, and the opening of the ground terminal module is smaller than the opening of the signal terminal module.

10. The electrical connector as claimed in claim 7, wherein at least one signal terminal is exposed to air for at least half of its entire length.

11. The electrical connector as claimed in claim 10, wherein the at least one signal terminal is exposed to air for at least 70% of its entire length.

12. An electrical connector assembly comprising:
a cage having a rear wall;
an electrical connector installed in the cage for mating with a plug module in a front-to-rear direction, the electrical connector comprising:
an insulating housing including:
a front housing having a front top wall and a pair of front side walls connected to the front top wall, the front housing being provided with an upper mating slot and a lower mating slot spaced apart in a top-to-bottom direction perpendicular to the front-to-rear direction; and
a rear housing cooperating with the front housing;
a plurality of terminal modules arranged in a transverse direction perpendicular to the front-to-rear direction and the top-to-bottom direction and accommodated in the insulating housing, each of the terminal modules including an insulating body and a plurality of conductive terminals held in the insulating body, the conductive terminals including contact portions disposed on opposite sides of the upper mating slot and the lower mating slot; and
a fixing mechanism for fixing the electrical connector to the rear wall of the cage, wherein
the rear housing includes a rear top wall and a pair of rear side walls extending downward from the rear top wall, and the rear top wall and the pair of rear side walls surround the plurality of terminal modules in three directions.

13. The electrical connector assembly as claimed in claim 12, further comprising a heat dissipation device mounted on a top wall of the cage and a light guide assembly mounted on an outer side of one side wall of the cage, and wherein the light guide assembly includes a plurality of light guide pipes, a connecting member for connecting the light guide pipes together, and a first fixing member for fixing the light guide assembly on the side wall, the side wall including a second fixing member matched with the first fixing member.

14. The electrical connector assembly as claimed in claim 12, wherein the fixing mechanism includes a first fixing mechanism for fixing the insulating housing and the rear wall and a second fixing mechanism for fixing the terminal module and the rear wall.

15. The electrical connector assembly as claimed in claim 14, wherein the first fixing mechanism includes a protruding portion protruding backward from a rear end of the rear side wall of the insulating housing and an opening provided on the rear wall that matches the protruding portion, and the second fixing mechanism includes an inwardly recessed slot formed on a rear side of each of the insulating bodies and a metal tab protruding forward from the rear wall to be received in the slot.

16. The electrical connector assembly as claimed in claim 12, further including an intermediate cage dividing a receiving space of the cage into an upper receiving space and a lower receiving space, and an intermediate heat sink installed in the intermediate cage, and wherein the intermediate cage includes an upper wall, a lower wall, and an intermediate channel formed between the upper wall and the lower wall, and the intermediate heat sink is installed in the intermediate channel.

17. The electrical connector assembly as claimed in claim 16, wherein the upper wall of the intermediate cage is provided with a plurality of downwardly protruding metal elastic pieces, the intermediate heat sink includes a flat base body and a plurality of fins extending upward from the base body, and the metal elastic pieces presses downward against the heat fins.

18. An electrical connector for mating with a plug module in a front-to-rear direction, comprising:
an insulating housing including:
a front housing having a front top wall and a pair of front side walls connected to the front top wall, the front housing being provided with an upper mating slot and a lower mating slot spaced apart in a top-to-bottom direction perpendicular to the front-to-rear direction;
a rear housing cooperating with the front housing;
a plurality of terminal modules arranged in a transverse direction perpendicular to the front-to-rear direction and the top-to-bottom direction and accommodated in the insulating housing, each of the terminal modules including an insulating body and a plurality of conductive terminals held in the insulating body, the conductive terminals including contact portions disposed on opposite sides of the upper mating slot and the lower mating slot, the terminal module including a plurality of signal terminal modules and a plurality of ground terminal modules arranged so that the conductive terminals in adjacent signal modules form a pair of differential signal terminals and the conductive terminals in one ground terminal module is a one-piece structure; and
at least one conductive adhesive tape, wherein
the rear housing includes a rear top wall and a pair of rear side walls extending downward from the rear top wall, and the rear top wall and the pair of rear side walls surround the plurality of terminal modules in three directions; and
each of the conductive terminals in the ground terminal module includes a joint portion extending out of the insulating body, and the joint portions of adjacent ground terminal modules are electrically connected through the at least one conductive adhesive tape.

19. An electrical connector assembly comprising:
a cage;

an electrical connector installed in the cage for mating with a plug module in a front-to-rear direction, the electrical connector comprising:
  an insulating housing including:
    a front housing having a front top wall and a pair of front side walls connected to the front top wall, the front housing being provided with an upper mating slot and a lower mating slot spaced apart in a top-to-bottom direction perpendicular to the front-to-rear direction; and
    a rear housing cooperating with the front housing; and
  a plurality of terminal modules arranged in a transverse direction perpendicular to the front-to-rear direction and the top-to-bottom direction and accommodated in the insulating housing, each of the terminal modules including an insulating body and a plurality of conductive terminals held in the insulating body, the conductive terminals including contact portions disposed on opposite sides of the upper mating slot and the lower mating slot; and
  a heat dissipation device mounted on a top wall of the cage and a light guide assembly mounted on an outer side of one side wall of the cage, wherein
the rear housing includes a rear top wall and a pair of rear side walls extending downward from the rear top wall, and the rear top wall and the pair of rear side walls surround the plurality of terminal modules in three directions; and
the light guide assembly includes a plurality of light guide pipes, a connecting member for connecting the light guide pipes together, and a first fixing member for fixing the light guide assembly on the side wall, the side wall including a second fixing member matched with the first fixing member.

* * * * *